UNITED STATES PATENT OFFICE 2,147,409

NONCORROSIVE ANTIFREEZE LIQUID

Headlee Lamprey, Buffalo, N. Y., assignor to Carbide and Carbon Chemicals Corporation, a corporation of New York No Drawing. Application June 12, 1937,
Serial No. 147,868

12 Claims. (Cl. 252—5)

The invention relates to new liquid compositions of non-corrosive and anti-freeze properties, which are especially adapted for use in the fluid cooling systems of internal combustion engines. It is particularly concerned with improved inhibitor materials for preventing metal corrosion in automobile cooling systems employing anti-freeze liquids containing alcohols.

Many different alcohols have been used as freezing point depressants in cooling fluids, including methanol, ethanol, propanol, and other monohydroxy alcohols, as well as the polyhydroxy alcohols, represented by ethylene glycol, propylene glycol, diethylene glycol and glycerol. In the compositions proposed by this invention any of these liquids may be used, and in the specification and claims where an alcohol is referred to, it is intended to include all of the saturated aliphatic hydroxy compounds or mixtures thereof.

The pure alcohols are not inherently corrosive to metals, but under conditions of use in anti-freeze liquids, a corrosive action is often encountered through decomposition and other factors. Usually the alcohol is diluted with water to obtain a mixture of the freezing point desired, and in circulation as a cooling fluid, it is constantly subjected to agitation in the presence of air. This aeration, coupled often with general or localized overheating, leakage of exhaust gas and other foreign materials into the cooling system, and numerous other factors, all tend to induce corrosive conditions in the liquid, which after prolonged use may become quite severe. It has therefore been considered essential to provide means for preventing corrosive conditions in alcohol anti-freeze liquids, and the most common expedient consists in adding minor quantities of inhibitor materials to the alcohol. Many compounds have been suggested in the art for this purpose, but the effectiveness of known inhibitor compositions in maintaining protection for all metals of a cooling system over extended periods is not entirely satisfactory.

It is an object of this invention to provide improved corrosion inhibitors for alcohol-containing anti-freeze liquids which will effectively protect all metals of a cooling system, and maintain substantially non-corrosive conditions in a cooling fluid employing an alcohol either in full strength or in dilution with water.

I have found that soluble salts of tungstic, selenic and molybdic acids are excellent corrosion inhibitors when added in minor quantities to any of the alcohols commonly used in anti-freeze liquids, and these salts afford effective protection for all metals of the usual cooling system, including iron, copper, brass, solder and aluminum. The alkali metal tungstates, selenates, and molybdates, particularly the sodium and potassium salts, and also the corresponding ammonium salts, are soluble in the alcohols to an extent sufficient to provide corrosion protection, and are especially preferred for their inhibitor action. Any one of these compounds, in quantities of approximately 0.05% to 1% by weight of the full strength alcohol shows a general inhibiting function, and will maintain non-corrosive conditions in the various dilutions of the alcohol used as an anti-freeze liquid. The preferred concentration of inhibitor may vary depending upon the particular alcohol employed and the extent to which it is diluted in the cooling fluid.

Although not essential for satisfactory corrosion inhibition, other known inhibitors may be added and mixed with the above compounds. For example, an alkaline substance, such as triethanolamine or sodium hydroxide, can be used, if desired, to impart a reserve alkalinity to the cooling fluid, and thereby prolong the effective life of the essential inhibitor compound under conditions where severe acidity may be developed. Minor quantities of soluble or emulsifiable oils may also be useful, particularly in their capacity to impart anti-leak properties to the fluid mixture. Anti-leak agents of the nature of gums, dyestuffs for coloring, and other additive materials heretofore employed in anti-freeze alcohols, may be used in admixture with a tungstate, selenate or molybdate salt without destroying or affecting the inhibiting function of the latter.

A specific anti-freeze composition, representative of the invention is one employing ethylene glycol as the alcohol, to which there is added as the essential corrosion inhibitor 0.5% by weight of sodium tungstate. In addition, about 2.0% by weight of an oil mixture, composed of 10 parts of sulfonated neat's-foot oil and 90 parts of mineral oil, can be used, and as an anti-leak, 0.03% of gum karaya has been found very effective. Sodium selenate or molybdate can be substituted for the tungstate in the above formula with substantially similar corrosion protection, and, in another modification, about 0.1% of a soluble phosphate or nitrate, such as sodium nitrate, can be added, where further specific protection for aluminum is desirable.

It will be understood that the inhibitors of this invention are applicable in use with any of the alcohols commonly employed in anti-freeze compositions, and they are especially effective with ethylene glycol, or other glycols and mixtures thereof. Dilution with water, as is usual in making the anti-freeze solutions, is not detrimental to the corrosion protection, which is maintained during normal usage of the cooling fluid. Modification in the specific formulae mentioned can be made to suit any particular alcohol and various dilutions thereof, and the invention should not be limited other than as defined in the appended claims.

I claim:

1. A non-corrosive anti-freeze liquid comprising an alcohol and an inhibitor including as the essential component a soluble salt of an acid of the group consisting of tungstic, selenic, and molybdic acids.

2. A non-corrosive antifreeze liquid comprising an alcohol and an inhibitor including as the essential component a soluble salt of an acid of the group consisting of tungstic, selenic and molybdic acids, in an amount about 0.05% to about 1.0% by weight of the alcohol.

3. A non-corrosive anti-freeze liquid comprising ethylene glycol and an inhibitor including as the essential component about 0.05% to about 1.0% of sodium tungstate.

4. A non-corrosive anti-freeze liquid comprising ethylene glycol and an inhibitor including as the essential component about 0.05% to about 1.0% of sodium selenate.

5. A non-corrosive anti-freeze liquid comprising ethylene glycol and an inhibitor including as the essential component about 0.05% to about 1.0% of sodium molybdate.

6. In a non-corrosive anti-freeze liquid containing an alcohol and an oil inhibitor, an essential inhibitor of metal corrosion composed of a soluble salt of an acid of the group consisting of tungstic, selenic and molybdic acids.

7. In a non-corrosive anti-freeze liquid containing an alcohol and inhibitors of an emulsifiable oil, a soluble nitrate and a gum, an essential inhibitor of metal corrosion composed of a soluble salt of an acid of the group consisting of tungstic, selenic and molybdic acids.

8. Method of inhibiting corrosion of metals by an alcohol solution in contact therewith, which comprises contacting said solution with metals in the presence of an inhibitor including as the essential component a soluble salt of an acid of the group consisting of tungstic, selenic and molybdic acids.

9. Method of inhibiting corrosion of metals by an alcohol solution in contact therewith, which comprises contacting said solution with metals in the presence of an inhibitor including as the essential component about 0.05% to about 1.0% by weight of the alcohol of sodium tungstate.

10. A non-corrosive anti-freeze liquid comprising an alcohol and an inhibitor including as the essential component about 0.05% to about 0.1% of sodium tungstate.

11. A non-corrosive anti-freeze liquid comprising an alcohol and an inhibitor including as the essential component about 0.05% to about 0.1% of sodium selenate.

12. A non-corrosive anti-freeze liquid comprising an alcohol and an inhibitor including as the essential component about 0.05% to about 0.1% of sodium molybdate.

HEADLEE LAMPREY.